March 30, 1937.    E. GEBAUER-FUELNEGG ET AL    2,075,255
SETTING OF RUBBER HYDROCHLORIDE TRANSPARENT SHEETS
Filed Dec. 23, 1933
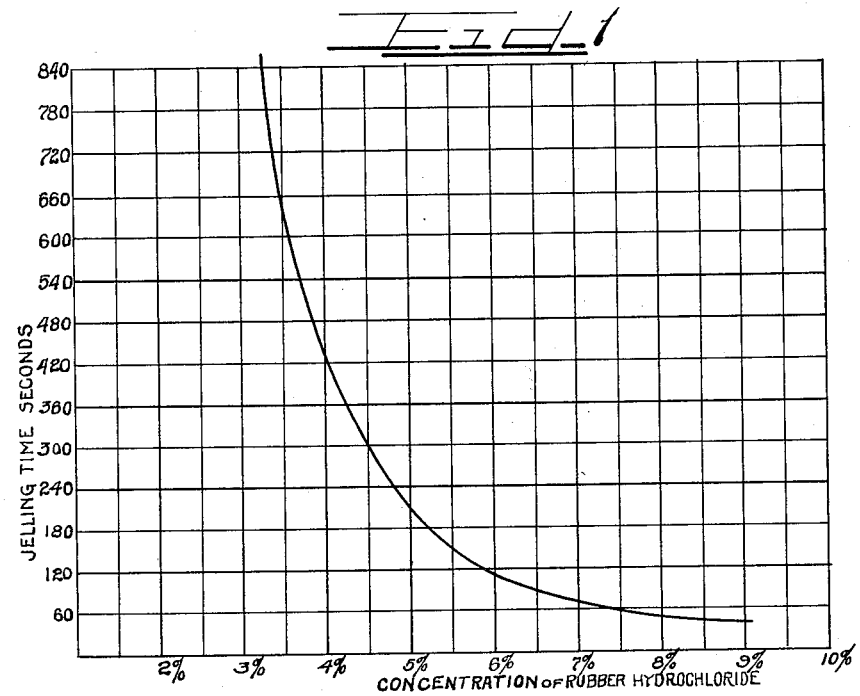
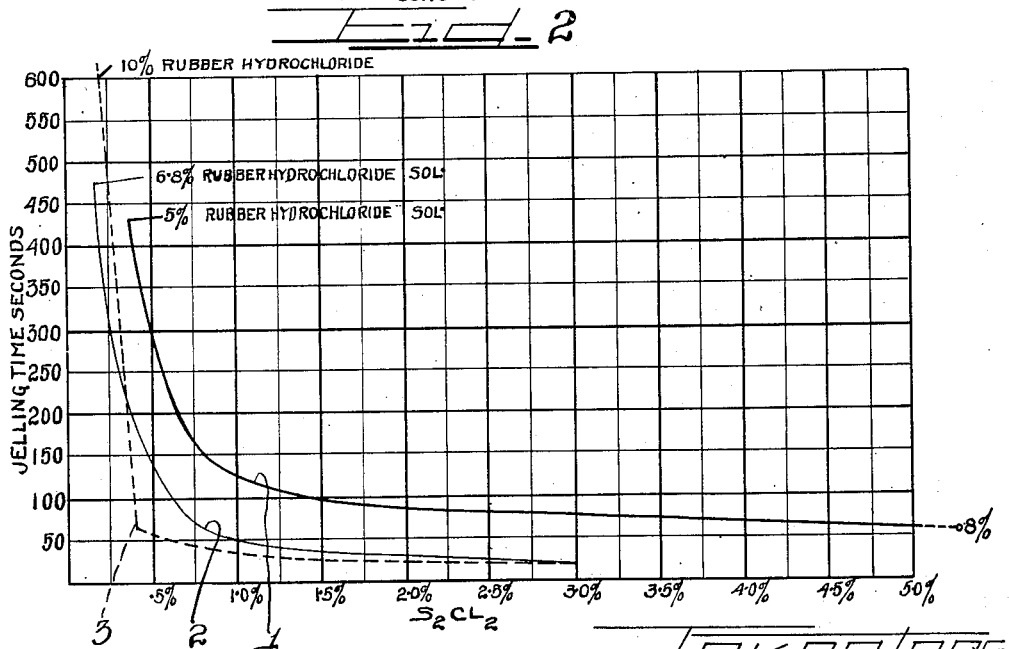
Inventors
Erich Gebauer-Fuelnegg.
Eugene Moffett
by Charles Kelly Attys.

Patented Mar. 30, 1937

2,075,255

UNITED STATES PATENT OFFICE 2,075,255

SETTING OF RUBBER HYDROCHLORIDE TRANSPARENT SHEETS

Erich Gebauer-Fuelnegg, Evanston, Ill., and Eugene W. Moffett, Gary, Ind., assignors, by mesne assignments, to Marbon Corporation, a corporation of Delaware Application December 23, 1933, Serial No. 703,865

23 Claims. (Cl. 260—1)

This invention relates to the preparation of a product resulting from the reaction of a butadiene polymer hydrohalide and a vulcanizing agent, such as sulfur monochloride or the like.

More specifically, the invention relates to the preparation of thin transparent sheet material comprising vulcanized butadiene polymer hydrochloride.

In the preparation of transparent sheet material, it has been the practice to employ solutions of such materials as nitrocellulose, cellulose acetate, gelatine or casein. These substances, in the form of solutions, are spread upon forming belts or the like to set and dry. When solutions of protein materials are used, they are preferably treated with a hardening agent, such as formaldehyde, either just before or just after being spread upon the forming belt.

We have now found that if a solution of a butadiene polymer hydrochloride, particularly a rubber hydrochloride, is treated with a vulcanizing agent and immediately thereafter is spread upon a forming belt, the vulcanizing or setting will take place upon the forming belt. The resulting vulcanized or jelled product may be stripped off as a thin transparent sheet having desirable properties as a material for packaging various commodities and in other ways for which such transparent sheet material has been employed.

It is, therefore, an object of this invention to provide a sheet material made from a butadiene derivative which has been treated with a sulfur compound.

It is a further object of this invention to provide a process for vulcanizing a butadiene polymer hydrohalide.

An additional object of this invention is to provide a vulcanized butadiene polymer hydrochloride, as a composition of matter.

A specific object of this invention is to form thin transparent sheets of vulcanized butadiene hydrochlorides.

Other and further objects of this invention will be apparent from the following specification and the accompanying claims.

In the copending application, Serial No. 703,866, filed of even date herewith entitled, "Reaction product of a butadiene derivative and a hydrogen halide and method of producing the same", a process is described for producing a variety of rubber hydrohalides or similar products from a hydrogen halide and a butadiene derivative. In that process, a suitable butadiene derivative, such as rubber, gutta percha, balata, or a synthetic material of similar chemical properties is treated with a hydrogen halide, preferably hydrogen chloride. In the preferred form of that invention, pale crepe rubber is treated with a liquid hydrogen chloride at a temperature and pressure such as will cause the hydrogen chloride to remain liquid. Under these conditions, a reaction takes place very rapidly in which the hydrogen chloride enters into the rubber or butadiene derivative molecule. In case the reaction is allowed to go to completion, the product will contain about 28% of chlorine or more. This reaction, whether allowed to go to completion or not, produces the preferred type of butadiene hydrochlorides used as initial materials in the process of the present invention.

It should be understood, however, that while a butadiene polymer hydrochloride prepared according to the above referred to method is preferred as an initial material for the invention since it produces a more transparent sheet, any butadiene polymer hydrochloride containing sufficient chlorine so that it is not too elastic and prepared by any method may be used. For example the rubber hydrochlorides prepared by Harries (Berichte; vol. 46 (1913) pp. 733–743) and by Weber (Berichte; vol. 33 (1905) pp. 779–796) are satisfactory.

A butadiene polymer hydrochloride as described above and containing about 28% or more of chlorine according to this invention is dissolved in benzol or its homologs, ethylene dichloride, carbon tetrachloride, tetrachlorethane or any other inert solvent, and a quantity of sulfur monochloride is added. Any one or more of numerous types of solvents may be used, the essential feature being that the solvent must dissolve both the butadiene hydrochloride and the sulfur monochloride, without reacting with either. The concentrations of these substances in the solution may vary over a wide range. This is best illustrated by reference to the drawing where the effect of changes in the concentrations of the various ingredients is shown for the case of rubber hydrochloride of 30% chlorine content. It should be understood that the viscosity measurements (jelling time) plotted in the curves are relative values only and were not obtained by a standardized viscosimeter.

Figure 1 is a graphical representation of the relationship between the concentration of rubber hydrochloride and the jelling or setting time of the solution, the concentrations of rubber hydrochloride being plotted as abscissae and the jelling time as ordinates. The curve shown is typical of the relationship between concentration of the rubber hydrochloride solution and the jelling time when the percentage of sulphur monochloride is kept constant.

It will be seen from the curve of Figure 1 that a slight increase in the concentration of the rubber hydrochloride will cause a large decrease in the setting time when the solution is very dilute. However, for more concentrated rubber hydrochloride solutions, the setting time tends to assume a constant value. Thus, when the concentration of the rubber hydrochloride reaches about 9%, the setting time has reached a constant value of about 40 seconds.

We have found that by keeping the sulphur monochloride percentage constant at 1% by weight based on the rubber hydrochloride the jelling point varies from about 40 seconds for an 8.9% solution of rubber hydrochloride to 555 seconds for a 3.9% solution. This fact is of great importance in the modification of this process wherein the solution sets to form a transparent sheet material, as will be explained below.

We have found that there are additional means for varying the setting time, such as, for example, the variation in the sulfur monochloride concentration of the solution. The effect of such variation is illustrated in Figure 2. In this figure, the concentration of the sulfur monochloride is plotted as abscissae and the setting time as ordinates. Three series of experiments were performed for three separate concentrations of rubber hydrochloride solutions.

In curve No. 1 (Fig. 2), the concentration of the rubber hydrochloride is held constant at 5% and the sulfur monochloride concentration is varied. This curve shows that, for small concentrations of sulfur monochloride, an increase in the concentration will produce a large decrease in the setting time increment, while for more concentrated solutions, the setting time tends to approach a constant value of about 50 seconds. Thus it will be seen that by varying the sulfur monochloride concentration between $\frac{1}{10}$ percent and 8 percent by weight, keeping the rubber hydrogen chloride concentration constant at 5%, the setting time may be varied from 50 seconds to 430 seconds, or about 7 minutes.

Curve No. 2, in Figure 2, shows the variation in setting time of a 6.8% rubber hydrochloride solution in which the sulfur monochloride content was varied from about 0.2% to 3.0%. The curve shows that the setting or jelling time varied from about 450 seconds to about 20 seconds.

Curve No. 3, in Figure 2, shows the variation in setting time of a 10% rubber hydrochloride solution. This curve shows that the jelling time drops even more rapidly than in curves 1 and 2, as the concentration of the sulfur monochloride is increased.

The curves clearly show that the jelling time is a function of the concentration of rubber hydrochloride and also a function of the concentration of the vulcanizing agent within certain limits. Thus below a .3 to .5% sulfur monochloride concentration, rubber hydrochloride solutions will not jell except upon long standing whereas for concentrations over about 3% there is practically no decrease in jelling time.

We have also tested the solubility of the jelled products in solvents such as benzol and have found that the products containing low percentages of sulfur monochloride are completely soluble while above .7% the solubility decreases gradually until at 3% concentration the product only swells but does not dissolve.

These experimental findings establish that the setting time of the solutions increases as the degree of vulcanization of the rubber hydrochloride increases and that about 3% by weight of sulfur monochloride is sufficient for substantially complete vulcanization of a rubber hydrochloride containing about 28% chlorine or more.

The halogen content of the butadiene polymer hydrochloride used also effects the setting time since rubber hydrochlorides with low chlorine content jell more rapidly than those with a high chlorine content. This is perhaps due to the fact that the rubber compounds with a low chlorine content are only partly saturated and the unsaturated part reacts with the vulcanizing agents in the usual vulcanization reaction, i. e. the addition of sulfur to the molecule, whereas the more completely hydrochlorinated compounds may react to form products such as the following:

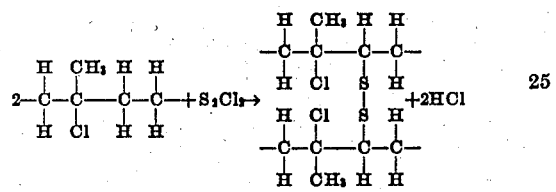

Vulcanization accelerators of the usual type, such as mercaptobenzothiazole, zinc diamyl dithiocarbamate, dipiperidyl thiuram disulphide, tetramethyl thiuram disulphide and the diphenyl guanidine salt of mercaptobenzothiazole have been used to shorten the jelling time. Some of these accelerators themselves, such as tetramethyl thiuram disulphide and dipiperidyl thiuram disulphide, are considered to be vulcanizing agents for rubber but we have found that they do not cause any appreciable vulcanizing action on rubber hydrochlorides containing 28% or more of chlorine. This supports our theory that our vulcanizing reaction proceeds somewhat as indicated by the above formula. It is to be understood, however, that our invention is not to be limited by any theory or hypothesis until the same has been proved.

In the preparation of thin transparent sheets according to our invention butadiene hydrohalides containing about 28% or more chloride, such as the rubber hydrochlorides described above, are dissolved in an inert solvent described above, such as benzol, preferably to a concentration between 3 and 10%. A proportioning pump flows this solution together with the proper amount of a vulcanizing agent such as sulfur monochloride to the mixing chamber of a casting machine. The ingredients are intimately admixed at room temperatures and the mixture is immediately cast onto the traveling forming belt of the machine as a thin film. The machine is provided with a coating roll or doctor bar for coating a smooth film of the desired thickness on the belt. The film is allowed to set and dry on the belt at temperatures between 60 to 100° C. (preferably about 80° C.) and a thin transparent web is then stripped from the belt. The web is flexible, tough and very satisfactory for wrapping purposes.

The rubber hydrochloride solution may be compounded with fillers, such as natural and synthetic resins, hard chlorinated diphenyl compounds (hard arochlors) and plasticizers such as, for example, chlorinated paraffin, soft chlorinated diphenyls (soft arochlors) diphenyl ethers and the like. These materials impart special properties to the finished sheet. Likewise, the finished sheet may be coated or laminated onto other types of sheet material.

We prefer to use, in our preferred setting process, vulcanizing agents, such as sulfur-halogen compounds, for example, sulfur monochloride ($S_2Cl_2$), chlor-sulfonic acid ($SO_3HCl$), thionyl chloride ($SOCl_2$) and the like, although, of course, other known agents may be used without departing from our invention.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. The process which comprises reacting a vulcanizing agent with a butadiene polymer hydrohalide.

2. The process which comprises reacting a sulfur-halogen compound with a rubber hydrohalide.

3. The process which comprises reacting sulfur monochloride with a rubber hydrochloride.

4. The process of forming thin transparent sheet material which comprises mixing a solution of a butadiene polymer hydrohalide with a vulcanizing agent and casting the mixture on a forming belt.

5. The process of forming thin transparent sheet material which comprises mixing a solution of a rubber hydrochloride with a sulfur-chlorine compound, casting the mixture on a forming belt in film form, allowing the film to set and stripping the sheet from the belt.

6. The process of forming thin transparent sheet material which comprises mixing a solution of a rubber hydrochloride containing about 28% or more chlorine with from .3 to 3% of sulfur monochloride, casting the mixture in film form on a smooth surface, allowing the mixture to jell and stripping the resulting sheet from the surface.

7. The process of forming thin transparent sheet material which comprises dissolving a rubber hydrochloride containing 28% or more chlorine in an inert solvent, incorporating from .3 to 3% of sulfur monochloride based on the weight of the rubber hydrochloride in solution into said solution, immediately casting the mixture in thin film form on a forming belt, allowing the film to set, drying the film, and stripping the dried film from the belt.

8. The process of forming thin transparent sheet material which comprises dissolving a rubber hydrochloride containing about 30% chlorine in benzol, incorporating 1% by weight of $S_2Cl_2$ based on the weight of rubber hydrochloride in the solution into said solution, immediately casting the mixture in a continuous operation and in thin film form onto a traveling forming belt, allowing the cast film to set, drying the film at temperatures between 60 to 80° C. and stripping the resulting sheet from the belt.

9. As a new article of manufacture, a thin, transparent and relatively non-elastic film composed of a vulcanized rubber hydrochloride containing 28% or more chlorine, said vulcanized rubber hydrochloride being obtained by reacting a rubber hydrochloride with a vulcanizing agent.

10. A composition of matter composed essentially of a vulcanized butadiene polymer hydrohalide said vulcanized product being obtained by reacting a butadiene polymer hydrohalide with a vulcanizing agent.

11. A composition of matter composed essentially of the reaction product of a vulcanizing agent and a rubber hydrohalide.

12. A composition of matter composed essentially of the reaction product of a sulfur-halogen vulcanizing compound and a rubber hydrochloride.

13. A composition of matter composed essentially of the reaction product of a vulcanizing agent and a rubber hydrohalide, and including a vulcanization accelerator.

14. As a new product, a vulcanized butadiene polymer hydrohalide, obtained by reacting a butadiene polymer hydrohalide with a vulcanizing agent.

15. As a new product, a vulcanized rubber hydrochloride, obtained by reacting a rubber hydrochloride with a vulcanizing agent.

16. As an article of manufacture, a thin transparent sheet of a vulcanized butadiene polymer hydrohalide, said vulcanized product being obtained by reacting a butadiene polymer hydrohalide with a vulcanizing agent.

17. As an article of manufacture a thin transparent sheet of a vulcanized rubber hydrochloride, said vulcanized rubber hydrochloride being obtained by reacting a rubber hydrochloride with a vulcanizing agent.

18. The product obtained by reacting a sulfur-halogen vulcanizing compound with a rubber hydrohalide.

19. The product obtained by reacting sulfur chloride with a rubber hydrochloride.

20. As an article of manufacture, thin transparent sheet material formed by jelling a butadiene polymer hydrohalide with a vulcanizing agent.

21. As an article of manufacture, thin transparent sheet material formed by jelling a rubber hydrochloride with sulfur monochloride.

22. As an article of manufacture, thin flexible sheet material formed by jelling a rubber hydrochloride containing 28% or more of chlorine with sulfur monochloride in the presence of a vulcanizing accelerator.

23. A vulcanized rubber hydrohalide having the apparent nuclear formula:

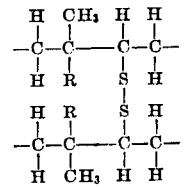

in which R is a halogen.

ERICH GEBAUER-FUELNEGG.
EUGENE W. MOFFETT.